Patented Dec. 23, 1930

1,786,125

UNITED STATES PATENT OFFICE

WALTER C. O'KANE, OF DURHAM, NEW HAMPSHIRE

FUNGICIDE AND INSECTICIDE

No Drawing.  Application filed May 18, 1927. Serial No. 192,483.

This invention relates to fungicides and insecticides and more particularly to compositions that exhibit both fungicidal and insecticidal properties which supplement each other, and to processes of making such compositions.

There have been numerous attempts in the prior art to produce such compositions, and particularly from oils and other materials that exhibit insecticidal properties in combination with metallic components that exert fungicidal properties. Such attempts have however, not been successful for numerous reasons among which may be noted that water-in-oil emulsions were often used which upon dilution required additional emulsifying agents with the result that the metallic component was either so altered as to be rendered substantially ineffective, or to cause burning.

Among the objects of the present invention is the production of fungicides and insecticides that are free from such disadvantages; that are retained on the plants etc. against the action of rain etc.; and that exhibit many other advantages.

The invention will be illustrated by the more detailed description set forth below, it being understood however that this more detailed description is given by way of illustration only, and not by way of limitation since various changes may be made therein by those skilled in the art without departing from the scope and spirit of this invention.

A principal feature of the invention resides in the use of an oil having insecticidal properties. White oil obtained as a fraction of appropriate properties from the distillation of crude hydrocarbon oil, the product being refined so that it is not toxic to foliage, offers an excellent material for these purposes. Such an oil will exhibit characteristically a viscosity not over one hundred seconds Saybolt at one hundred degrees Fahrenheit, and will show not over one percent loss to sulphuric acids. The color is not important but is a term commonly used in referring to oils of this description.

If desired this refined oil may be used to extract any suitable organic material such as pyrethrum of various species, derris of various species, or other substances that will furnish an additional killing agent effective against insects. Or, such materials may be added to the refined oil.

The refined oil, either with or without the addition of the organic material, is then emulsified, using for that purpose any suitable emulsifying agent, such as potash or rosin soap, oleic acid soap, ammonium caseinate, or others, the resulting emulsion containing about thirty-five percent of water, more or less.

This oil-in-water emulsion of white oil is then combined with a metallic component, particularly in colloidal condition. As such metallic component, the colloidal copper material resulting from the reduction of copper compounds by appropriate reducing agents may be used. For example, a copper compound such as copper hydroxide or cupric oxide, or a soluble compound such as copper sulphate is intimately mixed with waste molasses such as "black strap" or waste sulphite liquor in the presence of alkali such as sodium hydroxide, and the materials allowed to react until reduction of the copper to the colloidal condition results. Heat may be used in effecting such reduction, and when so used the temperature is desirably kept below 100° C. say preferably at 80° C. The colloidal copper paste resulting from such treatment is probably a cuprous oxide or hydrated oxide.

While copper compounds have been referred to above, other metallic components may be used in a strictly analogous manner.

The colloidal copper paste is then compounded with the oil emulsion referred to above. This may be done by diluting each with appropriate amounts of water, the two materials so diluted then being poured together. Or, the oil emulsion may be so adjusted by use of a suitable emulsifying agent as to make possible a satisfactory combination of the colloidal copper paste and the oil emulsion without dilution until after the combination is effected. Or, the colloidal copper paste may be dried and then combined with the oil emulsion.

As an example of a fungicide and insecticide obtained as a result of this invention, the following may be cited: A white oil of suitable properties, innocuous to foliage, is used as a means of extracting the organic poison contained in pyrethrum, such extraction being made at the rate of one gallon of oil to one pound of pyrethrum. This impregnated oil is then emulsified to secure a stable emulsion. A colloidal copper paste is prepared as indicated above. One pound of this paste is diluted with twenty-five gallons of water. One gallon of the impregnated oil emulsion is diluted with twenty-five gallons of water. These two are combined by pouring them together. The resulting material is found to possess marked efficiency as an agent for killing leaf-eating insects, such as caterpillars, and for killing sucking insects, such as plant lice. It is free of disadvantages incident to such materials such as arsenate of lead, hitherto used for killing leaf-eating insects, because such materials could not safely be employed on edible plants. It is effective in preventing the growth of fungous diseases, such as the so-called blight attacking potatoes. It is innocuous to foliage. It gives a new and valuable completeness of coating of the leaf surface. It is resistant to rain in a new and valuable manner.

The type of fungicide and insecticide obtained as a result of this invention has several unique and desirable properties. For example considering the copper containing material referred to hereinabove, it may be noted a spray of the copper material alone (that is not in the oil emulsion) like others of its class, presents certain characteristics in drying on the leaves. The particles of copper tend to collect toward the periphery of the globules of the spray. After the globules dry, it leaves these particles in a ring. Also, as the globule dries, it tends to contract while retaining its globular form. There is therefore a mechanical limitation to the completeness with which the leaf surface is covered. On the other hand, in the combination referred to above the droplets of spray made therefrom, present a flattened shape. Within each droplet there are some particles of oil to which some of the still smaller particles of copper adhere, and dispersed among these oil particles are many other copper particles. As the droplet dries the particles of oil spread and coalesce, thus distributing the copper particles evenly over the leaf surface. It follows therefor, that there is a more complete coverage by copper when using the products of the present invention, this being an important factor in protection from entrance of plant disease.

In addition, it has been found that the combination spray made from the materials of the present invention, presents a physical character that is more resistant to rain than is the copper spray alone. Since it is rain that removes from the leaf surface the protection afforded by a copper spray or other fungicide, the products of the present invention offer a substantial advantage in this particular.

Further it may be noted, that prior art attempts have frequently used a copper soap in a water-in-oil emulsion. To obtain the oil-in-water emulsion necessary to obtain dilution prior to application, large quantities of additional emulsifying agent were required, resulting in the copper being so altered as to be ineffective, or to cause burning. Insofar as known, the products of this invention, solve this problem for the first time.

Of considerable practical importance is the fact, that by the present invention there is obtained a material that, because of its copper content is an effective fungicide, because of its oil content is a contact insecticide, and because of the organic alkaloid contained in it, is an effective killing agent for caterpillars or other leaf eating insects.

The term "waste material having reducing and colloid-protecting properties" is hereinafter used to refer to both the waste molasses reducing agent and also the waste sulphite liquor. The term "impregnated white oil" is hereinafter used to cover the white oil containing an added ingredient as the extracted pyrethrum referred to above.

Having thus set forth my invention, I claim:

1. A fungicide and insecticide consisting of hydrocarbon white oil carrying a colloidal metal derivative component.

2. A fungicide and insecticide consisting of a hydrocarbon white oil emulsion carrying a colloidal copper containing material.

3. A fungicide and insecticide consisting of a hydrocarbon white oil emulsion in water and a colloidal copper containing material obtained by reduction of a copper compound in the presence of alkali by waste molasses of sugar refineries.

4. A fungicide and insecticide consisting of white oil emulsion and a colloidal copper containing product obtained by the reduction of a copper compound by a waste material having reducing and colloid-protecting properties.

5. A fungicide and insecticide consisting of an impregnated white oil and a metal derivative component.

6. A fungicide and insecticide consisting of a pyrethrum-impregnated hydrocarbon white oil carrying a colloidal copper material.

7. A fungicide and insecticide consisting of an oil-in-water emulsion carrying a colloidal metal derivative component, said oil being a hydrocarbon oil which is not toxic to foliage, but which oil exhibits a viscosity of not substantially over 100 seconds Saybolt at 100° F.

WALTER C. O'KANE